US012681454B2

(12) United States Patent (10) Patent No.: US 12,681,454 B2
Ikeguchi (45) Date of Patent: Jul. 14, 2026

(54) INTERFERENCE DETERMINATION DEVICE

(71) Applicant: DAIHEN Corporation, Osaka (JP)

(72) Inventor: Makoto Ikeguchi, Osaka (JP)

(73) Assignee: DAIHEN Corporation, Osaka (JP)

( * ) Notice: Subject to any disclaimer, the term of this patent is extended or adjusted under 35 U.S.C. 154(b) by 379 days.

(21) Appl. No.: 18/492,154

(22) Filed: Oct. 23, 2023

(65) Prior Publication Data

US 2024/0402674 A1 Dec. 5, 2024

(30) Foreign Application Priority Data

May 31, 2023 (JP) ................................. 2023-089940

(51) Int. Cl.
*G05B 19/4061* (2006.01)
*G06T 7/50* (2017.01)
(52) U.S. Cl.
CPC ............ *G05B 19/4061* (2013.01); *G06T 7/50* (2017.01); *G05B 2219/37555* (2013.01); *G05B 2219/39083* (2013.01); *G05B 2219/40476* (2013.01); *G06T 2207/10028* (2013.01)
(58) Field of Classification Search
CPC ...... G05B 19/4061; G05B 2219/37555; G05B 2219/39083; G05B 2219/40476; G06T 7/50; G06T 2207/10028
See application file for complete search history.

(56) References Cited

U.S. PATENT DOCUMENTS

| | | | | |
|---|---|---|---|---|
| 8,798,372 | B1* | 8/2014 | Korchev | ............. G06V 20/176 |
| | | | | 382/195 |
| 2021/0093407 | A1* | 4/2021 | Fredrickson | ........... A61B 34/74 |
| 2022/0383593 | A1* | 12/2022 | Aigerman | ............... G06T 19/20 |
| 2023/0098696 | A1 | 3/2023 | Nakagawa | |
| 2023/0410430 | A1* | 12/2023 | Kutsyy | ................... B25J 9/163 |

FOREIGN PATENT DOCUMENTS

| | | |
|---|---|---|
| CN | 115056225 A | 9/2022 |
| JP | 2011-131303 A | 7/2011 |
| JP | 2018-206038 A | 12/2018 |
| KR | 10-1798132 B | 11/2017 |
| KR | 10-2023-0043706 | 3/2023 |

* cited by examiner

*Primary Examiner* — David F Dunphy
(74) *Attorney, Agent, or Firm* — Sterne, Kessler, Goldstein & Fox P.L.L.C.

(57) ABSTRACT

The interference determination device includes a distance measurement unit measuring a distance to an object contained in a workspace of a robot; a decimation unit decimating point cloud data obtained by the distance measurement unit, based on a range and a number of points of the point cloud data obtained by the distance measurement unit; an extraction unit extracting point cloud data, contained in a determination region encompassing a robot region that corresponds to a model of the robot positioned in the workspace, from point cloud data after being decimated by the decimation unit; and a determination unit determining that the robot interferes with the object when the point cloud data extracted by the extraction unit is located inside the robot region.

3 Claims, 6 Drawing Sheets

FIG. 3A                         FIG. 3B

FIG. 4A                          FIG. 4B
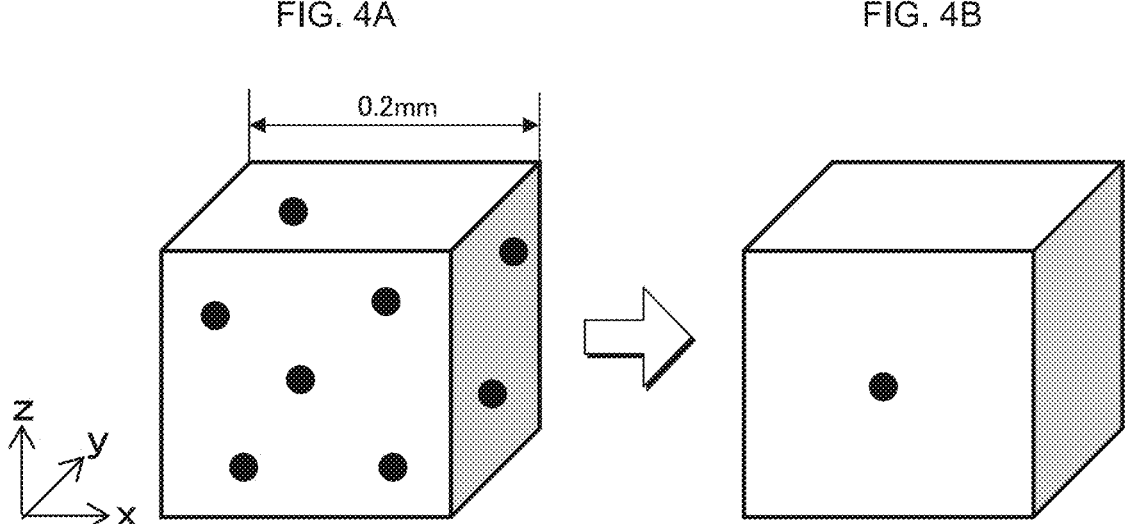

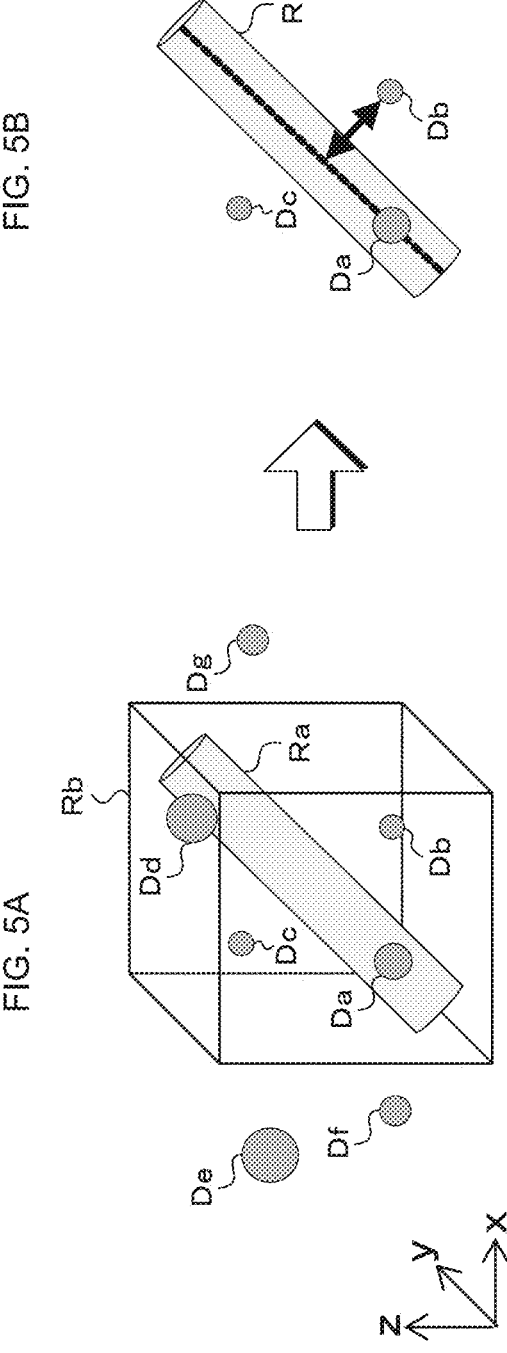

INTERFERENCE DETERMINATION DEVICE

BACKGROUND

Field

The present invention relates to an interference determination device.

Description of Related Art

In planning the motion of a robot operating in a factory or the like, it is the conventional practice to check for potential interference of robot parts such as an arm. One commonly adopted method for checking whether or not there will be any interference includes acquiring point cloud data of three-dimensional coordinates corresponding to the robot and other objects, for example, and uses the obtained data. However, the point cloud data, if used entirely, would cause a large processing load, and therefore it is desirable to reduce the point cloud data efficiently for use in the processing.

Patent Publication JP-A-2011-131303 discloses an interference check device that reduces processing load in checking for interference between a plurality of components of a robot, for example. This interference check device uses an interference matrix stored therein to check for interference in the robot, with the robot parts being classified into sections such as head, chest, hip, right upper arm, right elbow, right forearm, and so on, and the interference matrix being designed to identify every combination of sections that entail a possibility of interference in a certain orientation of the robot.

In accordance with a robot orientation expected from the operation commands from a controller, the interference check device refers to the interference matrix, and when there is a combination of sections with possible interference, the device determines whether or not the three-dimensional coordinates corresponding to these sections overlap each other so as to detect interference.

SUMMARY

The interference check device of Patent Publication JP-A-2011-131303 checks for interference between parts of a robot and not between the robot and other objects.

Accordingly, it is an object of the present invention to provide an interference determination device capable of efficiently reducing point cloud data to be used for the determination of whether or not a robot interferes with other objects.

An interference determination device according to one embodiment of the present invention includes: a distance measurement unit measuring a distance to an object contained in a workspace of a robot; a decimation unit decimating point cloud data obtained by the distance measurement unit, based on a range and a number of points of the point cloud data obtained by the distance measurement unit; an extraction unit extracting point cloud data, contained in a determination region encompassing a robot region that corresponds to a model of the robot positioned in the workspace, from point cloud data after being decimated by the decimation unit; and a determination unit determining that the robot interferes with the object if the point cloud data extracted by the extraction unit is located inside the robot region.

According to this embodiment, after obtaining the point cloud data corresponding to the object contained in the workspace of the robot, the obtained point cloud data is decimated based on the range and the number of points of the point cloud data. After the point cloud data has been decimated, sets of point cloud data contained in a determination region encompassing a robot region that corresponds to the model of the robot are extracted. If any of the extracted point cloud data is located inside the robot region, it can be determined that the robot will interfere with the object.

Thus the point cloud data corresponding to objects is decimated, and sets of point cloud data required for the determination of interference are extracted from this decimated point cloud data. By using the extracted sets of point cloud data, it is possible to determine whether or not there will be interference between the robot and other objects.

An interference determination device according to another embodiment of the present invention includes: a distance measurement unit measuring a distance to an object contained in a workspace of a robot; a decimation unit decimating point cloud data obtained by the distance measurement unit, based on a range and a number of points of the point cloud data obtained by the distance measurement unit; and a determination unit determining that the robot interferes with the object when point cloud data after being decimated by the decimation unit is located inside a robot region that corresponds to a model of the robot positioned in the workspace.

According to this embodiment, after obtaining the point cloud data corresponding to the object contained in the workspace of the robot, the obtained point cloud data is decimated based on the range and the number of points of the point cloud data. If the decimated point cloud data is located inside the robot region, it can be determined that the robot will interfere with the object.

Thus by using the point cloud data corresponding to objects after decimation, it is possible to determine whether or not there will be interference between the robot and other objects.

In the embodiments described above, the decimation unit, in decimating point cloud data based on a range and a number of points of the point cloud data obtained by the distance measurement unit, may compute a size of a space for demarcating a group of points in point cloud data to be decimated, and decimate the point cloud data for each group demarcated by the space.

According to this embodiment, the space formed by the point cloud data is uniformly divided by demarcation, and the point cloud data can be decimated for each unit of demarcation. This allows for well-balanced decimation of dispersed point cloud data.

In the embodiments described above, when a total number of remaining points of point cloud data after decimation exceeds a target number of points, the decimation unit may increase the size of the space and further decimate the point cloud data for each group demarcated by the enlarged space.

According to this embodiment, even if the number of points of the point cloud data is greater than the target number of points after the decimation, the number of points can be adjusted to become closer to the target number of points by repeating decimation.

An interference determination device according to another embodiment of the present invention includes: a distance measurement unit measuring a distance to an object contained in a workspace of a robot; an extraction unit extracting point cloud data, contained in a determination region encompassing a robot region that corresponds to a model of the robot positioned in the workspace, from point cloud data obtained by the distance measurement unit; and a determination unit determining that the robot interferes with the object if the point cloud data extracted by the extraction unit is located inside the robot region.

According to this embodiment, after obtaining the point cloud data corresponding to the object contained in the workspace of the robot, sets of point cloud data contained in a determination region encompassing a robot region that corresponds to the model of the robot are extracted from the obtained point cloud data. If any of the extracted point cloud data is located inside the robot region, it can be determined that the robot will interfere with the object.

Thus sets of point cloud data required for the determination of interference are extracted from the point cloud data corresponding to objects, and by using the extracted point cloud data, it is possible to determine whether or not there will be interference between the robot and other objects.

In the embodiments described above, the determination region may be provided for each link of the robot, and the determination unit may determine whether or not the robot interferes with the object for each link of the robot.

According to this embodiment, when it is determined that there will be interference in one of the links that configure the robot, the determination process for the remaining links can be omitted.

According to the present invention, an interference determination device can be provided, which is capable of efficiently reducing point cloud data to be used for the determination of whether or not a robot will interfere with other objects.

BRIEF DESCRIPTION OF DRAWINGS

FIG. 3A is a diagrammatic view illustrating a cube that demarcates a group of points in point cloud data;

FIG. 3B is a diagrammatic view illustrating the decimation of point cloud data for each group of points demarcated by the cube;

FIG. 4A is a diagrammatic view illustrating a cube that demarcates a group of points in point cloud data;

FIG. 4B is a diagrammatic view illustrating the decimation of point cloud data for each group of points demarcated by the cube;

FIG. 5A is a diagrammatic view illustrating a relationship between sets of point cloud data and a determination region encompassing a robot region;

FIG. 5B is a diagrammatic view illustrating sets of point cloud data extracted from the point cloud data in FIG. 5A.

DETAILED DESCRIPTION

Figure 1:
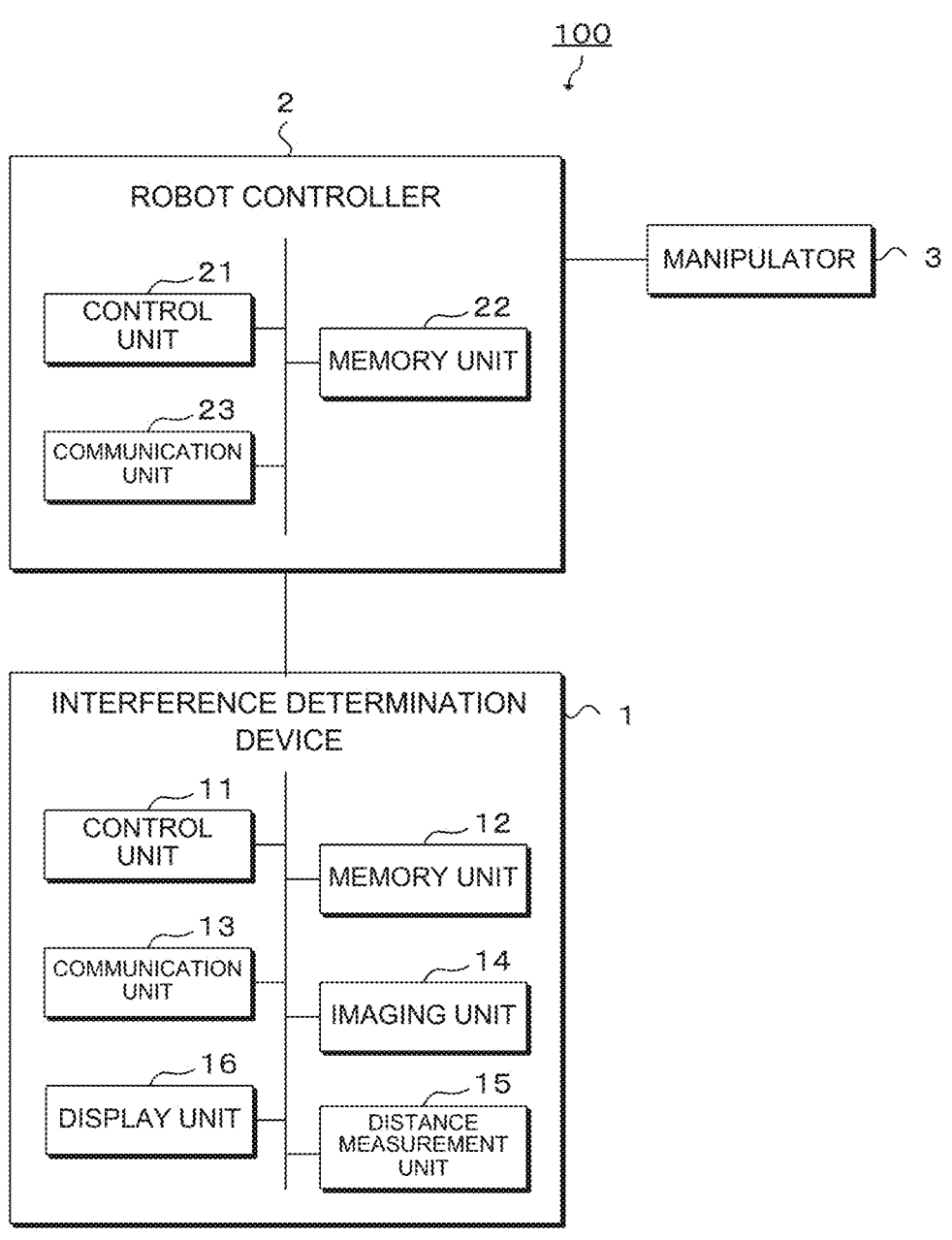
FIG. 1 is a diagram illustrating a configuration of a welding robot system including an interference determination device according to one embodiment.

A preferred embodiment of the present invention will be described with reference to the accompanying drawings. Elements given the same reference numerals in each drawing have the same or similar configuration. The drawings are diagrammatic and the sizes and proportions of various components do not reflect the actual measurements.

FIG. 1 is a schematic configuration diagram of a welding robot system including an interference determination device according to one embodiment. The welding robot system 100 includes the interference determination device 1, a robot controller 2, and a manipulator (robot) 3, for example. The interference determination device 1 and robot controller 2, and the robot controller 2 and manipulator 3, are connected to each other via a network. The interference determination device 1 and robot controller 2 are connected by wireless communication such as WiFi (Wireless Fidelity), for example, while the robot controller 2 and manipulator 3 are connected via a communication cable, for example. The network can be a wired network (including a communication cable), or a wireless network.

The welding robot system 100 may include a teach pendant. The teach pendant is an operation device that can be connected to the robot controller 2 and used by the operator to teach the manipulator 3 how to move.

The manipulator 3 is a welding robot, which performs arc welding to a workpiece that is the welding target in accordance with the operation conditions set in the robot controller 2. The manipulator 3 includes, for example, an articulated arm mounted on a base member that is fixed on a floor or elsewhere in a factory, and a welding torch (tool) coupled to the distal end of the articulated arm. Welding wire supplied to the welding torch is not included in the configuration of the manipulator 3.

The robot controller 2 is a control unit that controls the operation of the manipulator 3, and includes a control unit 21, a memory unit 22, and a communication unit 23, for example.

The control unit 21 is a processor, which executes a welding program or the like stored in the memory unit 22 to control the manipulator 3.

The communication unit 23 is a communication interface and controls the communication with the interference determination device 1 and manipulator 3 that are connected via a network.

The robot controller 2 may further include a welding power supply unit. The welding power supply unit supplies welding current and voltage to the manipulator 3 in accordance with the preset welding operation conditions to generate arc between the tip of the welding wire and the workpiece, for example. The welding power supply unit may be provided separately from the robot controller 2.

The interference determination device 1 may be a portable terminal with a digital camera, for example. Portable terminals include any terminals that can be carried around, for example, such as a tablet terminal, smartphone, personal digital assistant (PDA), notebook PC (personal computer), and so on. The interference determination device 1 includes a control unit 11, a memory unit 12, a communication unit 13, an imaging unit 14, a distance measurement unit 15, and a display unit 16, for example.

The control unit 11 is a processor, which executes a program stored in the memory unit 12 to control various units of the interference determination device 1.

The memory unit 12 is a computer-readable recording medium, which stores programs for implementing various functions of the interference determination device 1 and various sets of data used in those programs. Various sets of data include, for example, the information about the shape and size of each type of the manipulator 3, and the information about the shape and size of each type of the tool attached to the manipulator 3.

The communication unit 13 is a communication interface and controls the communication with the robot controller 2 that is connected via a network.

The imaging unit 14 is a 2D camera including a lens and an image sensor (imager), for example, which converts the light from an object received through the lens into an electrical signal (digital image data).

The distance measurement unit 15 is a 3D camera equipped with a distance measuring sensor, for example. The distance measuring sensor is a sensor capable of measuring the distance to an object. For example, LiDAR (Light Detection and Ranging) sensors, millimeter wave sensors, ultrasonic sensors or the like can be used as the distance measuring sensor.

The distance measurement unit 15 may be either a 3D camera alone or a distance measuring sensor alone. In the case where only a 3D camera is used, it is preferable to capture images of an object from several different points and to calculate three-dimensional coordinate data representing the object based on these several images. A known three-dimensional measurement technique that uses stereo vision can be used in this case.

By including a distance measuring sensor in the interference determination device 1, the positional relationship between the image sensor and the distance measuring sensor can be fixed, which will enable each sensor to obtain data at the same timing. This helps improve the processing efficiency of setting a specific position of a marker on point cloud data as will be described later. With an image sensor and a distance measuring sensor both included in the interference determination device 1, the operator of the interference determination device 1 can move to a given position where images of the workpiece and the marker can both be taken at the same time. This will help increase the operation efficiency.

Optionally, the interference determination device 1 may include a sensor that has both functions of an image sensor for capturing an image and of a distance measuring sensor for measuring the distance. This will allow simultaneous acquisition of the image of a welding target and the distance to the welding target from the same location, which helps further improve the processing efficiency of setting a specific position of a marker on point cloud data as will be described later.

The display unit 16 is a display with a touchscreen, for example, which displays images of the object captured by the imaging unit 14, and receives inputs from the operator such as operation instructions. The display unit 16 may be provided separately from the interference determination device 1 as a display device that has a touchscreen, for example.

Figure 2:
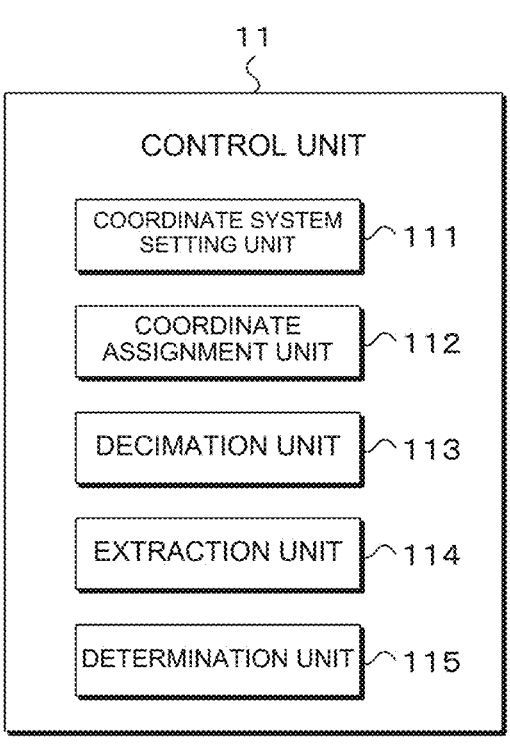
FIG. 2 is a diagram illustrating a functional configuration of a control unit in the interference determination device shown in FIG. 1.

FIG. 2 is a diagram illustrating a functional configuration of the control unit 11 of the interference determination device 1 according to the present invention. The control unit 11 of the interference determination device 1 includes, for example, a coordinate system setting unit 111, a coordinate assignment unit 112, a decimation unit 113, an extraction unit 114, and a determination unit 115, as functional units.

The coordinate system setting unit 111 establishes a three-dimensional user coordinate system based on a marker included in the image captured by the imaging unit 14, for example. Images taken by the imaging unit 14 include a workpiece and markers arranged in the space in which the manipulator 3 operates (hereinafter also referred to as "workspace"), for example. The marker can be any identifier that allows the interference determination device 1 to recognize its presence in the workspace. Preferably, it is an AR marker. The marker can be arranged at any position within the workspace.

More specifically, the coordinate system setting unit 111 establishes a three-dimensional user coordinate system, using a specific position of the marker (e.g., a corner or the center of the marker) as the point of origin.

The point of origin of the user coordinate system is not limited to a specific position of the marker, and may be the point of origin of a camera coordinate system that is defined on the basis of the lens of the camera, for example.

The coordinate assignment unit 112 assigns coordinates of the user coordinate system to the point cloud data obtained by the distance measurement unit 15 that measures the distances to objects included in the image captured by the imaging unit 14.

This process will be described in more detail. The coordinate assignment unit 112 detects a specific position of the marker based on the image captured by the imaging unit 14, and sets the detected specific position of the marker on the point cloud data obtained by the distance measurement unit 15. The coordinate assignment unit 112 assigns coordinates of the user coordinate system to the point cloud data, using the specific position of the marker set on the point cloud data as the point of origin (reference) of the user coordinate system. Thus the point cloud data is registered to the user coordinate system.

The specific position of the marker to be set on the point cloud data may be automatically identified by data analysis, for example, or may be designated by the operator indicating it on the point cloud data.

The decimation unit 113 decimates the point cloud data obtained by the distance measurement unit 15 based on the range and the number of points of the point cloud data obtained by the distance measurement unit 15. To give one example, the decimation unit 113 divides the range of point cloud data by the number of points in the data, and uses the obtained value as the length of one side of a cube for demarcating a group of points in the point cloud data.

The decimation unit 113 then decimates the point cloud data by reducing the number of points in each group demarcated by the cube to one. This process will be described in more detail with reference to FIG. 3A and FIG. 3B.

Figure 3A:
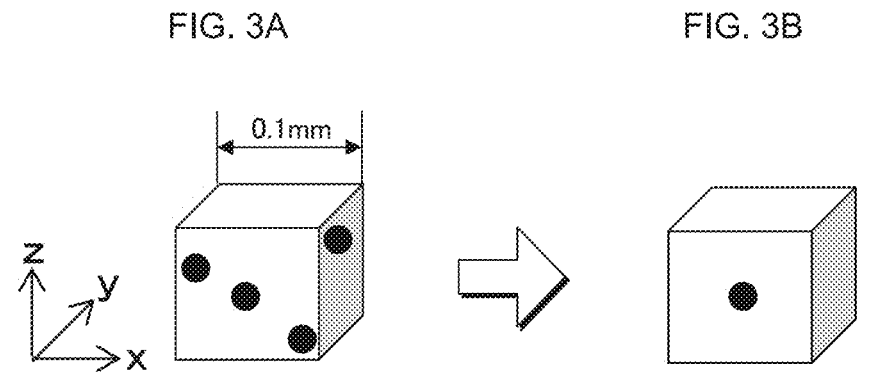

FIG. 3A and FIG. 3B illustrate a cube, with one side having a length of 0.1 mm, for demarcating a group of points in the point cloud data. The length of one side of this cube is obtained by dividing the "range of point cloud data" by the "number of points in the point cloud data", for example. In this example, the range of point cloud data extending in the x-axis direction of the user coordinate system is 5 m, and the number of points in the point cloud data is 50,000. Therefore, the length of one side of the cube for demarcating a group of points in the point cloud data is 0.1 mm, obtained by 5 m/50,000 points.

The decimation unit 113 demarcates the point cloud data obtained by the distance measurement unit 15 using cubes with one side having a length of 0.1 mm (FIG. 3A). The decimation unit 113 then decimates the point cloud data by reducing the number of points contained in each cube to one (FIG. 3B).

The one point that is left may be the point closest to a preset location such as the center of the cube, or any randomly selected point. The number of points that is to be left is not limited to one but can be set as suited within a range that allows efficient reduction of the point cloud data.

The space for demarcating a group of points in point cloud data is not limited to a cube and may be other 3D shapes such as a cuboid, for example.

If the total number of points in the point cloud data left after the decimation is greater than a target number of points, the decimation unit 113 may increase the size of the space and further decimate the point cloud data for each group demarcated by the enlarged space. The total number of points left after the decimation of the point cloud data can thus be adjusted to be closer to the target number of points. This process will be described in more detail with reference to FIG. 4A and FIG. 4B.

FIG. 4A and FIG. 4B illustrate a cube, with one side having a length of 0.2 mm, for demarcating a group of points in the point cloud data. The drawings show that the length of one side of the cube shown in FIG. 3A and FIG. 3B, which is 0.1 mm, has been doubled, to 0.2 mm. The multiplying factor for increasing the length of one side can be calculated by dividing "the number of points left after the decimation" by "the target number of points," for example. In the illustrated example, the target number of points is 10,000, and the number of points left after the decimation is 20,000. In this case, the multiplying factor for increasing the length of one side is 2, which is obtained by 20,000/10,000. Therefore, FIG. 4A and FIG. 4B show a cube, one side of which is 0.2 mm, twice as large as 0.1 mm that is the length of one side of the cube shown in FIG. 3A and FIG. 3B.

The extraction unit 114 shown in FIG. 2 extracts sets of point cloud data that are contained in a determination region encompassing a robot region, which corresponds to the 3D model of the manipulator 3, from the point cloud data after decimated by the decimation unit 113. The 3D model of the manipulator 3 is virtually placed in the workspace displayed on the screen of the interference determination device 1. The 3D model of the manipulator 3 may be placed in the position or orientation that can be randomly determined based on a welding program, for example, or that can be designated by the operator indicating a point on the screen as desired.

The robot region corresponding to the 3D model of the manipulator 3 may be set based on the information about the shape and size of the manipulator 3 corresponding to the type of the manipulator 3, the information about the orientation of the manipulator 3, and the information about the shape and size of the tool corresponding to the type of the tool attached to the manipulator 3, such as a welding torch. The type of the manipulator 3, and the orientation information of the manipulator 3 (e.g., angle information of each axis) are preferably obtained from the robot controller 2.

The determination region that encompasses the robot region should preferably be set in a range that can absorb possible errors in the point cloud data obtained by the distance measurement unit 15, to a size with some allowance to accommodate the manipulator 3 with a welding torch mounted thereon. This way, the influence of possible errors in the point cloud data can be removed from the range before setting the determination region, which helps enhance the accuracy of determination for interference. The determination region may be provided for each link of the manipulator 3.

One image of extracting sets of point cloud data from a determination region that is provided for each link of the manipulator 3 will be depicted with reference to FIG. 5A and FIG. 5B. FIG. 5A is a diagrammatic view of a robot region Ra, which corresponds to one link of a 3D model of the manipulator 3, a determination region Rb that encompasses this robot region Ra, and some of the point cloud data Da to Dg after decimated by the decimation unit 113.

The extraction unit 114 extracts sets of point cloud data Da, Db, and Dc that are contained in the determination region Rb from the sets of point cloud data Da to Dg after decimated by the decimation unit 113.

FIG. 5B is a diagrammatic view illustrating the sets of point cloud data Da, Db, and Dc extracted by the extraction unit 114.

The determination unit 115 shown in FIG. 2 determines that the manipulator 3 will interfere with an object present in the workspace if any of the point cloud data extracted by the extraction unit 114 is located inside the robot region. This process will be described in more detail with reference to FIG. 5B.

The determination unit 115 determines whether or not any of the point cloud data Da, Db, and Dc extracted by the extraction unit 114 is located inside the robot region Ra. In FIG. 5B, the point cloud data Da is positioned inside the robot region Ra. In this case, the determination unit 115 determines that the manipulator 3 will interfere with an object present in the workspace.

In the case where the determination region is set up for each link of the manipulator 3, the determination unit 115 determines whether or not the manipulator 3 will interfere with an object for each link of the manipulator 3.

Figure 6:
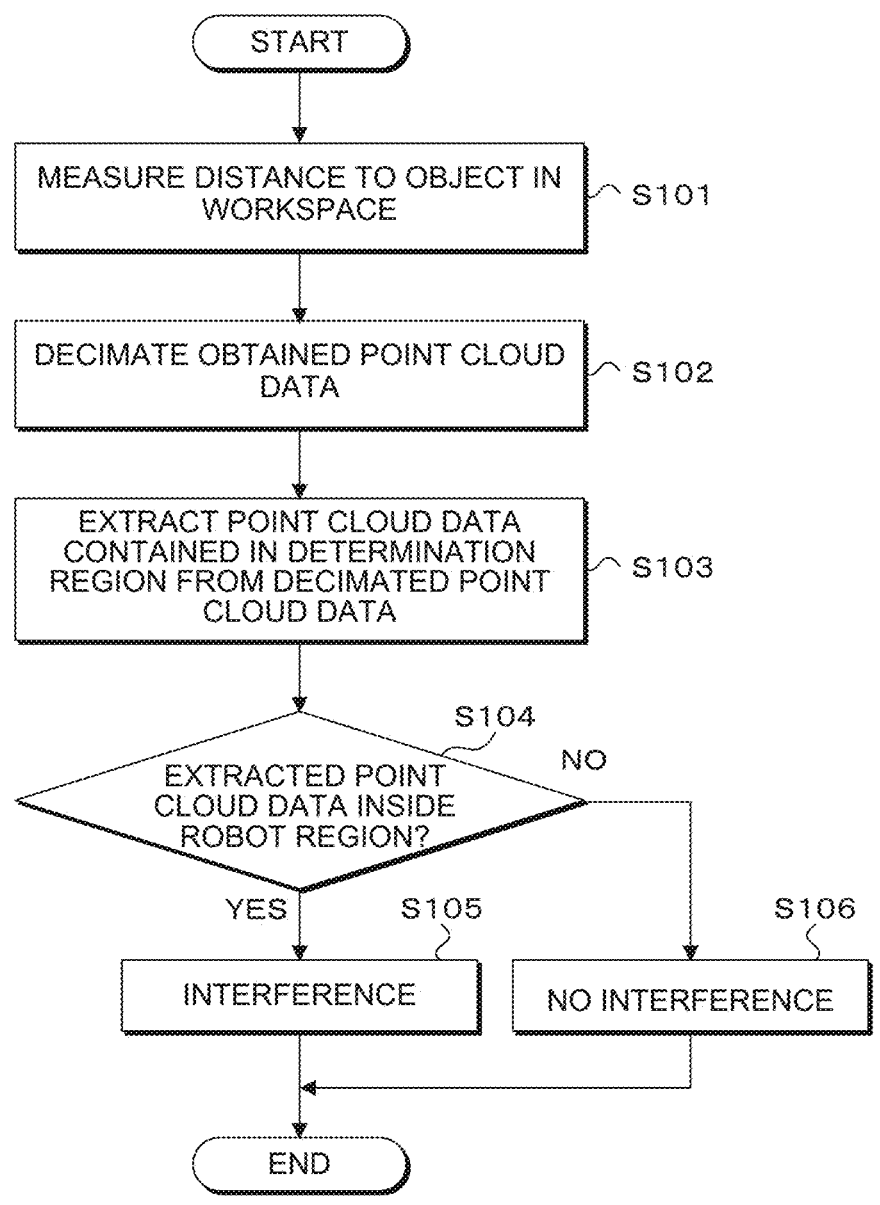
FIG. 6 is a flowchart for explaining an example of operation of the interference determination device.

One example of operation of the interference determination device 1 is described with reference to FIG. 6.

First, the distance measurement unit 15 of the interference determination device 1 measures the distances to the objects included in the image of the workspace captured by the imaging unit 14 (step S101).

The decimation unit 113 of the interference determination device 1 then decimates the point cloud data obtained by the measurement at step S101 based on the range and the number of points of the point cloud data (step S102).

Next, the extraction unit 114 of the interference determination device 1 extracts sets of point cloud data contained in the determination region that encompasses the robot region corresponding to a 3D model of the manipulator 3 that is virtually placed in the workspace on the screen, from the point cloud data after decimated at step S102 (step S103).

Next, the determination unit 115 of the interference determination device 1 determines whether or not any of the point cloud data extracted at step S103 is located inside the robot region (step S104).

If the determination is affirmative (step S104: YES), the determination unit 115 determines that the manipulator 3 will interfere with an object present in the workspace (step S105), and ends the operation.

If the determination at step S104 is negative (step S104: NO), the determination unit 115 determines that the manipulator 3 will not interfere with an object present in the workspace (step S106), and ends the operation.

In this embodiment, the manipulator 3 performs a welding operation. Interference herein refers to obstruction of the welding operation of the manipulator 3 (normal welding operation being hindered or restricted) due to physical contact with an object represented by the point cloud data.

As described above, the interference determination device 1 according to this embodiment obtains the point cloud data corresponding to the objects included in the workspace of the manipulator 3, and decimates the obtained point cloud data based on the range and the number of points of the point cloud data. The device then extracts sets of point cloud data that are contained in the determination region encompassing a robot region, which corresponds to the model of the manipulator 3, from the decimated point cloud data. If any of the extracted sets of point cloud data is located inside the robot region, it can be determined that there will be interference between the manipulator 3 and an object. Thus the point cloud data corresponding to objects is decimated, and sets of point cloud data required for the determination of interference are extracted from this decimated point cloud data. By using the extracted sets of point cloud data, it is possible to determine whether or not there will be interference between the manipulator 3 and other objects.

The interference determination device 1 according to the embodiment is thus capable of efficiently reducing point cloud data to be used for the determination of whether or not a robot will interfere with other objects.

Variation Example

The present invention is not limited to the embodiment described above, and may be implemented in various other forms without departing from the subject matter of the invention. The embodiment described above is illustrative in every sense and should not be interpreted as limiting.

For example, while the interference determination device 1 includes both of the decimation unit 113 and extraction unit 114 in the embodiment described above, the present invention is applicable to the cases where one of these units is omitted. Variation examples of these cases are described below.

Variation Example Omitting Extraction Unit 114

The determination unit 115 in this variation example determines that the manipulator 3 will interfere with an object that is present in the workspace if the point cloud data after decimated by the decimation unit 113 is located inside the robot region Ra corresponding to the 3D model of the manipulator 3 that is virtually placed in the workspace on the screen.

Variation Example Omitting Decimation Unit 113

The extraction unit 114 in this variation example extracts sets of point cloud data contained in the determination region Rb that encompasses the robot region Ra corresponding to the 3D model of the manipulator 3 that is virtually placed in the workspace on the screen, from the point cloud data obtained by the distance measurement unit 15.

Other Variation Examples

While a welding robot was described in the embodiment above, the present invention is not limited to this. For example, the present invention can be applied to various industrial robots such as handling robots that perform picking and other operations, and transport robots that perform certain tasks such as automated guided vehicles. In these cases, the welding program, welding target, and welding operation in the embodiment above can be replaced with an operation program or a transport program, an operation target or a transport target, and an operation task or a transport task, respectively.

While an image of the workspace is captured using one interference determination device 1 in the embodiment described above, a plurality of interference determination devices 1 may be used to capture images of the workspace from different positions. Determination can then be made for interference at each position where an image was taken. This will help enhance the accuracy of determination for interference.

What is claimed is:

1. An interference determination device, comprising:
a distance measurement unit measuring a distance to an object contained in a workspace of a robot;
a decimation unit decimating point cloud data obtained by the distance measurement unit, based on a range and a number of points of the point cloud data obtained by the distance measurement unit;
an extraction unit extracting point cloud data, contained in a determination region encompassing a robot region that corresponds to a model of the robot positioned in the workspace, from point cloud data after being decimated by the decimation unit; and
a determination unit determining that the robot interferes with the object when the point cloud data extracted by the extraction unit is located inside the robot region,
wherein, in decimating point cloud data based on a range and a number of points of the point cloud data obtained by the distance measurement unit, the decimation unit computes a size of a space for demarcating a group of points in point cloud data to be decimated, and decimates the point cloud data for each group demarcated by the space, and
wherein, when a total number of remaining points of point cloud data after decimation exceeds a target number of points, the decimation unit increases the size of the space and further decimates the point cloud data for each group demarcated by the enlarged space.

2. An interference determination device, comprising:
a distance measurement unit measuring a distance to an object contained in a workspace of a robot;
a decimation unit decimating point cloud data obtained by the distance measurement unit, based on a range and a number of points of the point cloud data obtained by the distance measurement unit; and
a determination unit determining that the robot interferes with the object when point cloud data after being decimated by the decimation unit is located inside a robot region that corresponds to a model of the robot positioned in the workspace,
wherein, in decimating point cloud data based on a range and a number of points of the point cloud data obtained by the distance measurement unit, the decimation unit computes a size of a space for demarcating a group of points in point cloud data to be decimated, and decimates the point cloud data for each group demarcated by the space, and
wherein, when a total number of remaining points of point cloud data after decimation exceeds a target number of points, the decimation unit increases the size of the space and further decimates the point cloud data for each group demarcated by the enlarged space.

3. The interference determination device according to claim 1, wherein
the determination region is provided for each link of the robot, and
the determination unit determines whether or not the robot interferes with the object for each link of the robot.

* * * * *